United States Patent [19]
Bronstert et al.

[11] Patent Number: 4,908,414
[45] Date of Patent: Mar. 13, 1990

[54] PREPARATION OF IMPACT-RESISTANT POLY(ALKYL)STYRENE

[75] Inventors: Klaus Bronstert, Carlsberg; Hans Hoenl, Obersuelzen; Adolf Echte, Ludwigshafen; Peter Klaerner, Battenberg, all of Fed. Rep. of Germany

[73] Assignee: BASF Aktiengesellschaft, Ludwigshafen, Fed. Rep. of Germany

[21] Appl. No.: 338,568

[22] Filed: Apr. 14, 1989

Related U.S. Application Data

[62] Division of Ser. No. 30,482, Mar. 27, 1987, abandoned.

[30] Foreign Application Priority Data

Apr. 8, 1986 [DE] Fed. Rep. of Germany ....... 3611704

[51] Int. Cl.$^4$ .......................................... C08F 279/02
[52] U.S. Cl. ...................................... 525/316; 525/261
[58] Field of Search ................. 525/316, 193, 206, 261

[56] References Cited

U.S. PATENT DOCUMENTS 4,169,115 9/1979 Tung et al. .
4,294,937 10/1981 Whitehead .

FOREIGN PATENT DOCUMENTS 1174214 12/1969 United Kingdom .
1576772 10/1980 United Kingdom .

Primary Examiner—Allan M. Lieberman
Attorney, Agent, or Firm—Keil & Weinkauf

[57] ABSTRACT

Impact-resistant translucent rubber-modified polystyrene is produced by polymerizing compounds from the class of the styrenes in the presence of an elastomeric polymer which contains thiol groups.

6 Claims, No Drawings

PREPARATION OF IMPACT-RESISTANT POLY(ALKYL)STYRENE

This application is a division of application Ser. No. 030,482, filed on Mar. 27, 1987, now abandoned.

The present invention relates to a process for preparing impact-resistant rubber-modified polystyrene and/or poly(alkyl)styrene by polymerizing a reaction bach consisting of (a) styrene, ring-alkylated styrenes, sidechain-alkylated styrenes and/or mixtures thereof and (b) one or more rubbery polymers P which have thiol groups P-(SH)$_x$, where x is an integer from 1 to 5 and P is a polymer composed of more than 80% of conjugated dienes.

Relevant prior art can be found in:
(1) German Laid-Open Application DOS 1,769,118
(2) European Patent 0,021,488
(3) German Published Application DAS 2,613,352 and
(4) German Laid-Open Application DOS 2,813,328.

(1) and (2) describe the preparation of impact-resistant non-translucent polystyrene. To prepare these products use is made of mixtures of polybutadiene and styrene/butadiene block copolymers. In the process described in (3), translucent impact-resistant polystyrenes are obtained batchwise using styrene/butadiene block copolymers.

Furthermore, (4) describes a process for preparing block copolymers wherein polymers having primary or secondary thiol end groups are brought into contact with a monomer capable of undergoing free radical polymerization and a free radical polymerization is initiated. The product formed is not impact-resistant polystyrene, but a block copolymer which contains one or more blocks of the starting polymer and one or more blocks of polymer from the free radical polymerization.

Styrene/butadiene block copolymers are more costly than polybutadiene rubbers. In addition, they have a comparatively high solution viscosity, which is a nuisance in particular in the production of impact-resistant polystyrene of high rubber content.

It is an object of the present invention to replace the relatively costly block rubbers used in (3) by less costly rubbers which can likewise lead to translucent, impact-resistant polystyrene and in addition have a lower solution viscosity.

The present invention provides a process for preparing impact-resistant translucent rubber-modified polystyrene and/or poly(alkyl)styrene, wherein a reaction batch consisting of styrene, ring-alkylated styrene, sidechain-alkylated styrene and/or mixtures thereof and one or more rubbery polymers is polymerized.

This process comprises polymerizing continuously in the presence or absence of a solvent and thermally or in the presence of free radical initiators by stirring for from 5 to 20 hours to an end conversion of from 70% to 95%, based on the monomer, the stirring being carried out in such a way that, on completion of the polymerization, the flexible component dispersed in the resulting impact-resistant styrene has an average particle diameter of from 0.1 to 0.8 μm, the starting rubbery polymer conforming to the formula P-(SH)$_x$, where x denotes the number of thiol groups per rubber molecule and is an integer from 1 to 5 and P is a polymer of conjugated dienes.

The process according to the invention makes it possible, on the one hand, to prepare translucent impact-resistant polystyrenes or polyalkylstyrenes using rubbers based on polybutadiene.. On the other hand, he preparation of non-translucent products having improved properties is possible.

In what follows, the process according to the invention and the starting materials required for carrying it into practice are described in more detail.

Processes for preparing impact-resistant polystyrene are known from (1), (2) or German Published Application DAS 1,770,392. The process described in (1) is carried out in the absence of a solvent, while the processes described in (2) and (3) are carried out in solution. Processes for preparing impact-resistant and at the same time translucent polystyrene are also described in publication (3).

The process according to the invention, in line with the existing processes, is carried out continuously; the rubbery polymer dissolved in the monomers (for example styrene) is polymerized in a conventional manner by stirring, i.e. under the action of shearing forces.

The polymerization is applied to a reaction batch which, for the purposes of the present invention, consists of the monomers and the rubbery polymer, the rubbery polymer being present in the reaction batch in an amount of from 3 to 30% by weight, preferably from 4 to 16 and in particular from 5 to 14% by weight, based on the mixture of monomers and rubbery polymer.

Suitable monomers are styrene, alkyl-substituted styrenes or mixtures thereof. With the intended purpose in mind, it is preferable to use only inexpensive styrene. It is also preferable to use mixtures of styrene and ring-alkylated styrenes such as p-methyl-styrene or α-methylstyrene or other substituted styrenes.

Suitable rubbery polymers for the process according to the invention are the modified polybutadienes described hereinafter, which contain one, two, three, four or five terminal or randomly distributed SH groups. They can in general be characterized in terms of the formula P-(SH)x, where P is a polymer of more than 80% conjugated dienes of 4 or 5 carbon atoms, such as butadiene or isoprene, or a copolymer of these monomers which may in addition contain up to 20% of aromatic vinyl monomers, and x is an integer from 1 to 5. Polymers which predominantly consist of polybutadiene are particularly suitable.

The structure and preparation of products of this type is known to those skilled in the art, for example from (4), U.S. Pat. No. 3,755,269 and British Pat. Nos. 1,432,782 and 1,432,783.

These rubbery polymers are preferably prepared by anionic polymerization of, for example, a conjugated diene, such as butadiene, in a conventional manner in a solvent, preferably a hydrocarbon, such as n-hexane or cyclohexane, and with an initiator, such as sec.-butyllithium. On completion of the polymerization the living polymer is then reacted with one or more moles of ethylene sulfide, propylene sulfide or some other episulfide per mole of catalyst to incorporate a —CH$_2$—CH$_2$—S—Li or a —CH$_2$C$_{(CH_3)}$—S—Li end group into the molecule. On using bi-functional starters for the polymerization, the rubber, after reaction with the sulfides mentioned, contains 2-S-Li end groups. It is further possible, although less preferable, to metallize completed rubbers in a conventional manner, for example as described in Metallation of unsaturated polymers and formation of graft polymers, Tate et al., J. Polym. Sci.

Part A-1, 9 (1971), 139–145, with Li and to convert the anionic groups which are thereby randomly distributed in the polymer molecule into -S-Li means of the abovementioned sulfides.

The rubbery polymer P-(SH)$_x$ is preferably polybutadiene having only one mercaptan group. The average molecular weight (GPC average) of the rubbery polymer of the formula mentioned should be within the range from 20 to 200,000, preferably within the range from 30 to 100,000.

It is of course also possible to use mixtures of rubbery polymers of the general formula P—(SH)$_x$ with other, nonmodified rubbers, such as polybutadiene, polyisoprene and the like, these rubbers ideally having molecular weights within the range from 120,000 to 400,000. The mixtures should contain not less than 30% of the rubbery polymer P-(SH)$_x$. The mixing ratio should be expediently be chosen in such a way that the average molecular weight of the mixture is within the range from 20,000 to 300,000, preferably from 30,000 to 100,000.

The process according to the invention is carried out in the presence or absence of a solvent. Possible solvents are toluene, xylene or preferably ethylbenzene as well as methyl ethyl ketone. The solvent is used in an amount of from 2 to 25% by weight, based on the monomers. Preference is given to the continuous process in solution with ethylbenzene as solvent.

The process according to the invention can be carried out thermally or in the presence of peroxidic initiators which form free radicals.

Suitable initiators of this type come from the group of the alkyl or acyl peroxides, such as hydroperoxides, peresters or peroxycarbonates. Preference is given to using the active graft initiators dibenzoyl peroxide, tert.-butyl peroxy-2-ethylhexanoate, tert.-butyl perbenzoate or others. The initiators are employed in amounts of from 0.02 to 0.2% by weight, based on the monomers. The employment of initiators is known to those skilled in the art; they further know that the decomposition of the initiators can be speeded up either by using additives such as amines or by choosing suitable temperature ranges in order to increase graft activity.

The process according to the invention can also be carried out in the presence of chain transfer agents. Suitable for this purpose are the customarily used mercaptans of 4 to 18 carbon atoms. Of the mercaptans mentioned, it is in particular n-butylmercaptan, n-octylmercaptan and n- or t-dodecylmercaptan which have proved suitable. The mercaptans are used in amounts of from 0.01 to 0.3% by weight, based on the monomers.

The process according to the invention can be carried out in the presence of lubricants, in particular mineral oils. Preferably these agents are added to the reaction batch. Suitable, in particular, are white oils, i.e. low-aromatics technical-grade white oils or aromatics-free medicinal white oil; the latter in particular if the impact-resistant polystyrenes obtained by the process are used for preparing moldings which need to comply with the law concerning food packaging.

Antioxidants may also be present during the polymerization. Particularly suitable are customary amounts of known sterically hindered phenols.

In the process, polymerization is carried out for from 5 to 20 hours to an end conversion of from 70 to 95%, preferably from 80 to 90%, based on the monomer. The polymerization is carried out at elevated temperatures which, for the purposes of the present invention, are temperatures within the range from 50° to 200° C., in particular within the range from 60° to 150° C. The skilled worker knows how to select, from the temperature ranges mentioned, the temperature required for a particular process if certain initiators are used or if certain products are to be prepared. The process can be carried out isothermally or with a temperature profile.

The process is carried out either in a tubular reactor or in a cascade of reactors connected in series. For the purposes of the present invention, a tubular reactor, which can also be referred to as a tower reactor, is a reactor whose longitudinal dimension is from 2 to 20 times the diameter of its cross-sectional area. These tower reactors can also be connected in series in the form of a cascade, but cascades of stirred kettles or of stirred kettles and tower reactors have also proved suitable. These processes are known and are described, for example, in A. Echte, Styrolpolymere, Winnacker-Küchler Chemische Technologie, volume 6, Organische Technologie II, Carl Hanser Verlag Munich Vienna 1982, pp. 373–390. The process is carried out with stirring, the polymerization proceeding in the presence or absence of a solvent in such a way that, at an early stage of conversion, two phases form, namely a coherent rubber/styrene phase and a noncoherent polystyrene/styrene phase. As conversion increases, a phase inversion takes place, and the polystyrene phase becomes the coherent phase. In this part of the reaction, the particle size is set by the speed of stirring.

These processes are known and are described, for example, in A. Echte, Angew. Makromol. Chem. 58/59 (1977), 175–198. The requisite shearing conditions are dependent, inter alia, on the given reactor size, the fillage, the nature of the filling material, the degree of viscosity and the type of stirrer element. The shearing conditions can be decided by a skilled worker by means of a few experiments. Relevant matter in this context can be found in M. H. Pahl, "Grundlagen des Mischens" in "Kunst-stofftechnik, Mischen von Kunststoffen", VDI-Verlag GmbH Dusseldorf 1983, pp. 1–72 and in Freeguard, 6.7., Structural control of rubber modified thermoplastic as produced by the mass process, in Brit. Polym. J. -6 (1974), 205–228.

The shearing conditions are chosen in such a way that, after the polymerization has ended, a dispersed flexible component having an average particle diameter of from 0.1 to 0.8 μm has developed within the modified polystyrene. The d$_{50}$ value is to be understood here as a number average. Preferably the average particle size can also be within the range from 0.2 to 0.6 μm. The result of polymerization of the reaction batch is then a graft copolymer of styrene on the rubbery polymer which forms the flexible phase. This flexible phase is finely divided in the rigid matrix, i.e. the polystyrene, and can be depicted on electron micrographs of thin sections. The particles are capsule particles. i.e. particles which consist of a single core of matrix material and a sheath of polybutadiene. See in this context Echte, loc. cit.

On completion of the polymerization, the polymer is isolated in a conventional manner. This can be effected, for example, by degassing the mixture on a degassing extruder, where the product is freed from excess styrene and, as the case may be, solvent under reduced pressure. Suitable conditions for this procedure are temperatures of from 180° to 280° C. and pressures of from 30 to below 1 mbar.

The impact-resistant and translucent polystyrenes obtained by the process according to the invention can be processed in a conventional manner for thermoplastics, for example by extruding, injection molding, calendering, blowmolding, pressing or sintering. It is particularly preferred to process the products prepared by the process according to the invention into shaped structures by injection molding. Translucent products are suitable in particular for producing see-through packaging films.

The properties listed in respect of samples of products obtained in the Examples and Comparative Experiments were measured as follows:

1. The viscosity number of the rigid matrix in ml/g was determined in accordance with DIN 53,724.
2. The tensile stress in N/mm$^2$ was determined in accordance with DIN 53,455.
3. The hole impact strength in kJ/m$^2$ was determined by the method of DIN 53,753.
4. To assess the translucence of products obtained with the process according to the invention, first a scale was established. This scale encompassed ratings 1 to 9 of Table 1 below, a low rating signifying a high translucence. To define the ratings listed in Table 1, a commercially available impact-resistant polystyrene (polystyrene KR 2791 from BASF Aktiengesellschaft) with capsule particle morphology was assigned the rating 4. Blends of this product with commodity polystyrene of viscosity number 96 ml/g in the weight ratios mentioned in Table 1 gave values of from 3 to 1 in respect of translucence. By blending with an commercially available impact-resistant polystyrene with cell particle morphology (polystyrene 476 L from BASF Aktiengesellschaft) mixtures of lower translucence, i.e. having the values 5 to 9 of the Table, were obtained. Measurement was effected by visual comparison of 2 mm thick compressed platelets of sample material with similar platelets made of the calibrating substance mentioned.

Electron micrographs of thin sections of the samples of the Examples and Experiments were prepared in a conventional manner and used to determine the particle size of the flexible component phase.

TABLE 1

| Translucence rating | Product A | Blend with parts by weight of commodity polystyrene | Product B |
| --- | --- | --- | --- |
| 1 | 20 | 80 | 0 |
| 2 | 40 | 60 | 0 |
| 3 | 60 | 40 | 0 |
| 4 | 100 | 0 | 0 |
| 5 | 96 | 0 | 4 |
| 6 | 92 | 0 | 8 |
| 7 | 88 | 0 | 12 |
| 8 | 84 | 0 | 16 |
| 9 | 80 | 0 | 20 |

The invention is hereinafter illustrated in more detail by reference to Examples. Parts and percentages are by weight, unless otherwise stated.

EXAMPLE

In a reactor cascade operated in a continuous manner and consisting of two stirred kettles connected in series and two reaction towers, solutions of 7.2 parts of polybutadiene, 2.4 parts of medicinal white oil, 6.0 parts of ethylbenzene, 84.4 parts of monostyrene, 0.12 part of antioxidant (Irganox 1076 from Ciba-Geigy AG, Basle) and 0.1 part of tert.-dodecylmercaptan were polymerized with a throughput of 4.5 l/h to a final solids content of 79±1% by weight.

4.5 l/h of the abovementioned solution were initially polymerized in a 6 l stirred kettle (horseshoe stirrer, 100 rpm) at 125° C. to a solids content of 12% (or 18% in the case of block copolymers being used). The reaction material was continuously discharged from the stirred kettle and fed into a 14 l stirred kettle (horseshoe shoe stirrer, 50 rpm). There polymerization was continued at 135° C. to a solids content of 36% (38%). The reaction material was again continuously discharged and fed into a 9 l tower reactor serving as third reaction stage. In this reactor, polymerization was continued at an increasing temperature of from 130° to 145° C. to a solids content of 58%. In a second, downstream tower reactor of the same size serving as fourth reaction stage, the reaction was continued at an increasing temperature of from 140° to 165° C. to a solids content of 79%. The reaction material discharged from the fourth reactor was heated in a heat exchanger to 240° C. and let down in a vessel operated under a pressure of 15 mbar. Here ethylbenzene and unconverted residual monomer were taken off in gas form. The polymer melt was discharged from the vacuum vessel and granulated.

Three kinds of polybutadiene and one styrene/butadiene block copolymer were compared.

1. Polybutadiene A ($\overline{M}_n$=60,000, —SH termination with propylene sulfide)—according to the invention
2. Polybutadiene B ($\overline{M}_n$=60,000, no —SH termination)
3. Polybutadiene C ($\overline{M}_n$=220,000, —SH termination with propylene sulfide)
4. Styrene/butadiene block copolymer ($\overline{M}_n$=240,000, 40% styrene content, 33% block styrene, molecular weight of styrene block 80,000)—prior art

| | Results | | | |
| --- | --- | --- | --- | --- |
| | 1 | 2 | 3 | 4 |
| Translucence | 4 | 10 | 10 | 4 |
| Tensile stress N/mm$^2$ | 29.5 | 24.5 | 25.0 | 30.6 |
| Hole impact strength kJ/m$^2$ | 8.5 | 10.2 | 10.5 | 7.9 |
| Particle type | capsules | cells | cells | capsules |

The results show that low molecular weight polybutadiene having SH end groups produces translucent impact-resistant polystyrene which is not obtainable without the end group or at a higher molecular weight; they further show that the product obtained by the process according to the invention matches the prior art product.

We claim:

1. Impact-resistant translucent rubber-modified polystyrene as obtained by a process comprising: continuously polymerizing a reaction batch containing 70 to 97% by weight of styrene and 3 to 30% by weight of a rubbery polymer, said rubbery polymer being based on more than 80% conjugated diene, having an average molecular weight of from 20,000 to 200,000, as measured by gel permeation chromatography, and conforming to the formula P-(SH)$_x$, where x denotes the number of thiol groups per rubber molecule and is an integer from 1 to 5 and P is a polymer of more than 80% conjugated dienes of 4 or 5 carbon atoms, in the presence or absence of a solvent, with the application of heat or in the presence of free radical initiators and while stirring for from 5 to 20 hours until an end conversion of from 70 to 95%, based on the monomer, is achieved, stirring being carried out in such a way that, on completion of the polymerization, the grafted rubber particles which represent the flexible phase of the product are dispersed in the resulting polystyrene and have an average particle diameter of from 0.1 to 0.8 μm.

2. The impact resistant translucent rubber-modified polystyrene as obtained according to claim 1, wherein the solvent is present in an amount of from 2 to 25% by weight, based on the monomer.

3. The impact resistant translucent rubber-modified polystyrene as obtained according to claim 1, wherein the solvent used is selected from the group consisting of toluene, xylene, methyl ethyl ketone and ethylbenzene.

4. The impact resistant translucent rubber-modified polystyrene as obtained according to claim 1, wherein the polymerization is carried out in the presence of a chain transfer agent.

5. The impact resistant translucent rubber-modified polystyrene as obtained by according to claim 1, where P is a polymer of more than 80% conjugated dienes selected from the group consisting of butadiene, isoprene or mixture thereof.

6. The impact resistant translucent rubber-modified polystyrene as obtained by according to claim 1, where P is polybutadiene and x is 1.

* * * * *